United States Patent
Richards

[19]

[11] Patent Number: 6,156,098
[45] Date of Patent: Dec. 5, 2000

[54] CHARGED DROPLET GAS SCRUBBER APPARATUS AND METHOD

[76] Inventor: Clyde N. Richards, P.O. Box 216, Peralta, N. Mex. 87042

[21] Appl. No.: 09/248,013

[22] Filed: Feb. 10, 1999

[51] Int. Cl.[7] .................................................. B03C 3/014
[52] U.S. Cl. ........................ 95/65; 95/70; 95/71; 95/78; 96/27; 96/53; 96/55; 239/690.1
[58] Field of Search .................................. 95/64, 65, 71, 95/78, 70; 96/27, 52, 53, 55; 239/690.1

[56] References Cited

U.S. PATENT DOCUMENTS

| | | | |
|---|---|---|---|
| 1,329,844 | 2/1920 | Meston . | |
| 1,945,061 | 1/1934 | Miller . | |
| 2,004,352 | 6/1935 | Simon | 96/27 X |
| 2,357,354 | 9/1944 | Penney | 96/27 |
| 2,525,347 | 10/1950 | Gilman . | |
| 2,730,195 | 1/1956 | Roberts . | |
| 2,864,458 | 12/1958 | De Graaf et al. | 96/27 |
| 3,113,168 | 12/1963 | Kinney | 261/22 |
| 3,503,704 | 3/1970 | Marks . | |
| 3,729,898 | 5/1973 | Richardson | 96/27 X |
| 3,785,118 | 1/1974 | Robertson . | |
| 3,807,137 | 4/1974 | Romell . | |
| 3,926,586 | 12/1975 | Matts . | |
| 3,960,505 | 6/1976 | Marks . | |
| 4,095,962 | 6/1978 | Richards | 96/27 X |
| 4,110,086 | 8/1978 | Schwab et al. | 95/64 X |
| 4,316,727 | 2/1982 | Hegemann et al. | 96/53 X |
| 4,541,844 | 9/1985 | Malcolm | 95/64 |
| 4,624,763 | 11/1986 | Chimenti | 96/27 X |
| 4,624,764 | 11/1986 | Mintz et al. | 96/27 X |
| 4,624,765 | 11/1986 | Cerkanowicz et al. | 96/27 X |
| 5,624,476 | 4/1997 | Eyraud | 95/65 |
| 5,941,465 | 8/1999 | Richards | 239/690.1 |

*Primary Examiner*—Richard L. Chiesa
*Attorney, Agent, or Firm*—Robert W. Harris

[57] ABSTRACT

Gas scrubbing apparatus and method, employing highly charged liquid droplets for removal of both particulates and pollutant gases from the gas to be cleaned, allowing scrubbing of uncharged particulates by means of monopole—dipole attractive forces between the charged liquid droplets and the electric dipoles induced in the uncharged particulates by the charged droplets; employing electrode geometry at the site of droplet production and charging, having spreading liquid sheet electrodes emitting the droplets from the edges of the liquid sheets, interspersed with electrically conductive induction electrodes, with electrostatic potential of no more than about 20 kv existing between the induction electrode array and the array of liquid sheets, and with spacing such that adequately high electric field strength can be maintained at the edges of the liquid sheets to allow adequate charging of the droplets emitted from the liquid sheets, without the occurrence of corona discharges which could deplete droplet charges or interfere with production of the electric field strength required for adequate droplet charging; allowing the particulate and pollutant gas scrubbing procedures to be carried out simultaneously in a single chamber; requiring no substantial power other than that for the blower or other means which moves the gas to be cleaned through the cleaning chamber; and allowing these results to be achieved with low liquid-to-gas flow ratios.

31 Claims, 4 Drawing Sheets

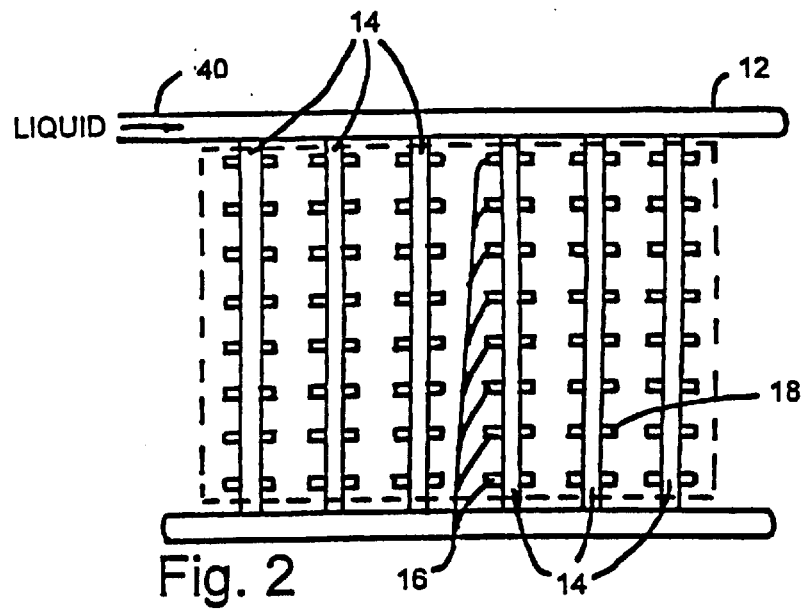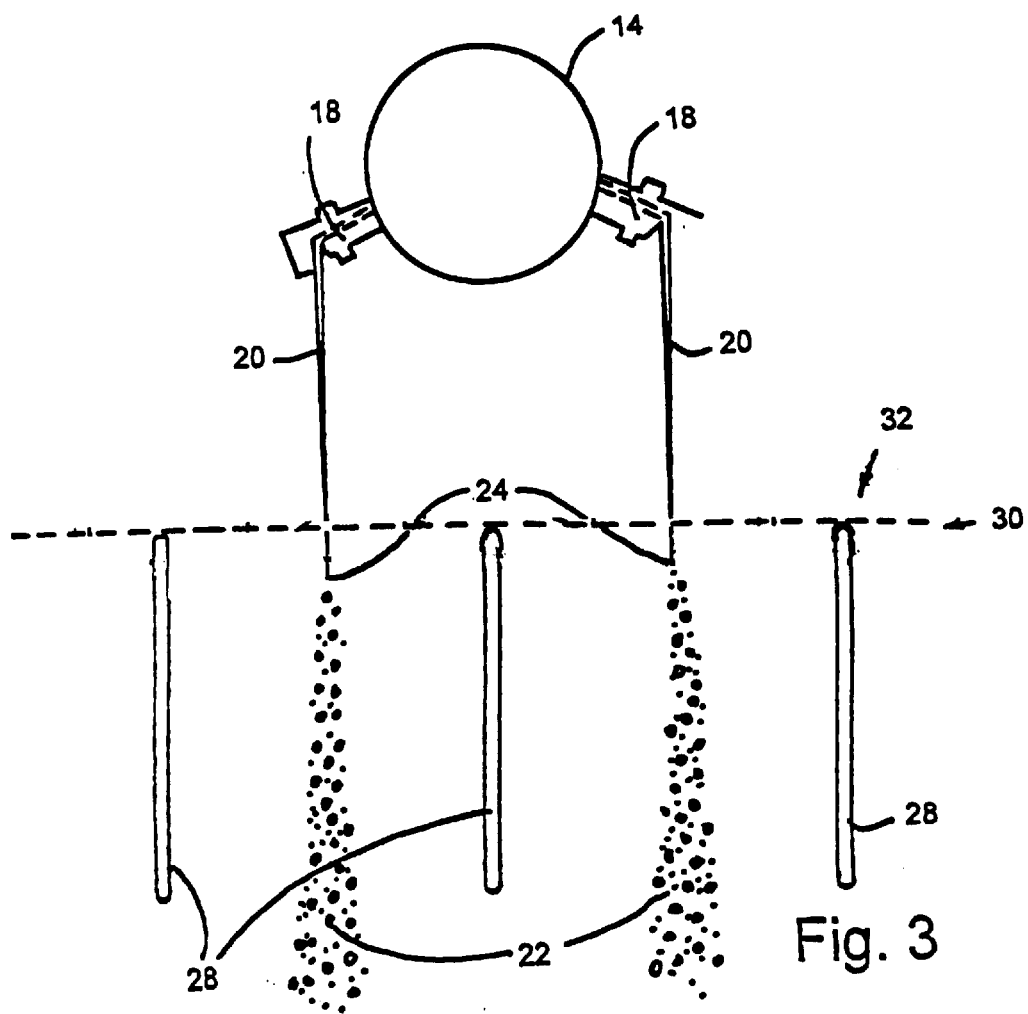

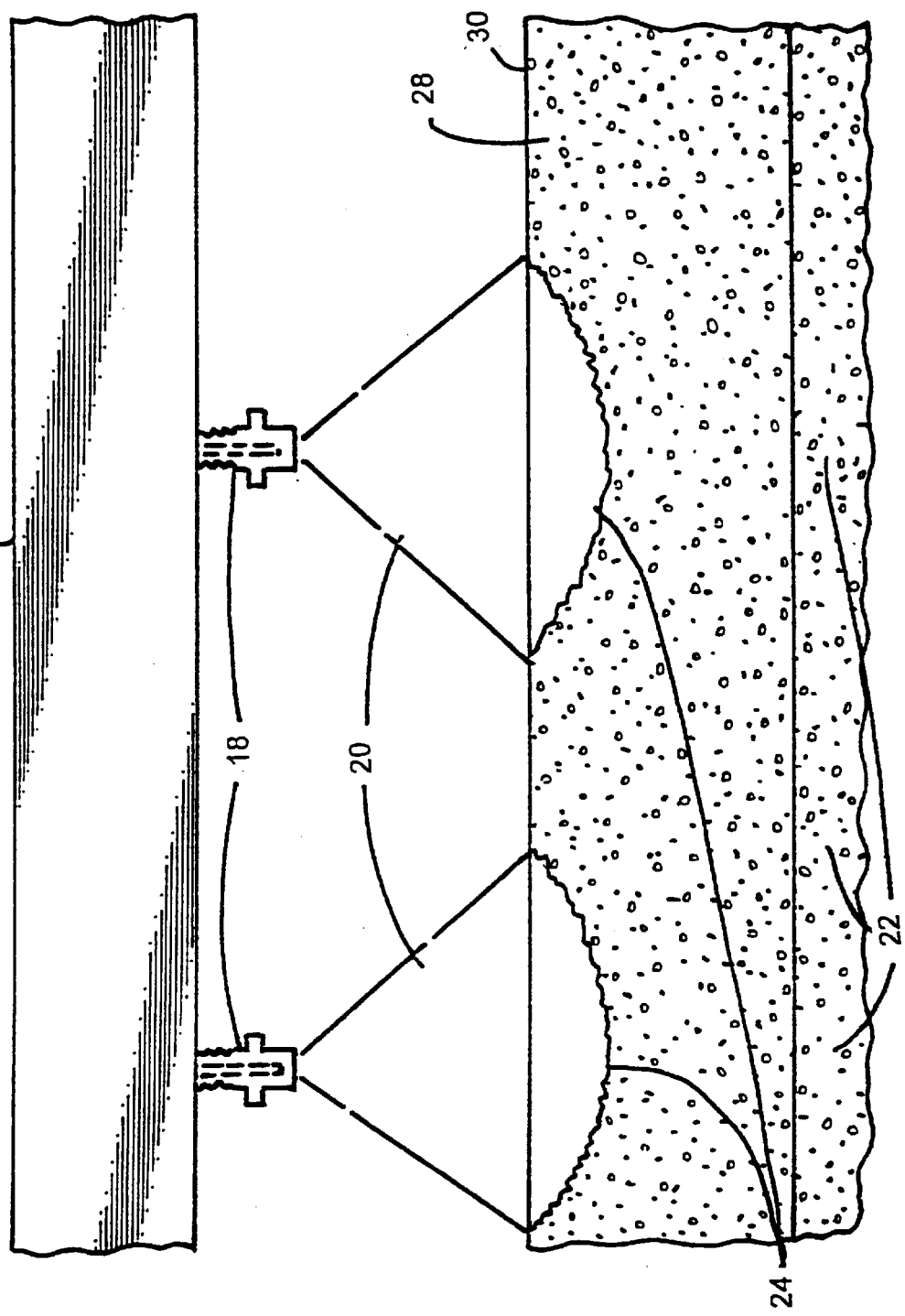

CHARGED DROPLET GAS SCRUBBER APPARATUS AND METHOD

RELATED APPLICATION

Applicant's earlier related patent application Ser. No. 08/385/331, entitled "Charged Droplet Spray Nozzle", filed Feb. 8, 1995, has since issued as U.S. Pat. No. 5,941,456.

BACKGROUND OF THE INVENTION

The invention pertains to apparatus and methods for cleaning gases, more specifically for removing both particulate contaminants and pollutant gases from the air or other gas to be cleaned, through effects of charged liquid droplets introduced into the gas to be cleaned.

There are numerous industrial processes, and power generation processes used at utility power plants, in which large quantities of air or other gases are used and become highly contaminated with pollutants falling in two broad classes: solid and liquid particulates, and pollutant gases such as toxic or acid gases. For example, both kinds of pollutants will be produced in large quantities by burning of coal at a coal-powered electric power generation facility.

Obviously there is a strong and continuing need to develop improved apparatus and methods for removing both kinds of pollutants from the contaminated air, before reintroduction of the treated air into the atmosphere, with improved pollutant removal efficiency; and to achieve that end by means which are more practical, reliable, and reasonable in cost.

It is known in the gas cleaning arts to remove particulates from the gas to be cleaned by an approach in which the particulates are first electrostatically charged by passing the gas containing the particulates through a suitable electrostatic charging apparatus, and then introducing into the gas to be cleaned numerous charged liquid droplets having electrical charges of polarity opposite to that of the charged particulates. In this approach the gas cleaning process proceeds, as to the particulates, through the effect of electrostatic attraction between the oppositely charged droplets and particulates, a monopole—monopole attractive force, inversely proportional to the square of the droplet—particulate separation distance and proportional to the product of the charge magnitudes, which force draws the particulates in for absorption by the liquid droplets. The droplets are then removed from the air stream, with the collected particulates, by processes well known in the art.

It is also known in the art to remove pollutant gases from an air stream through introduction of liquid droplets, by the process of adsorption of the toxic or acid gases by the liquid droplets, as their molecules come into contact with the surfaces of the droplets, followed by subsequent conventional removal of the droplets and collected pollutant gases from the air stream.

It is desirable to provide an apparatus and method allowing removal of uncharged particulates from the stream of gas to be cleaned, since this would obviate any need for preliminary electrostatic charging of the particulates. The present invention accomplishes this through introduction, into the gas to be cleaned, of liquid droplets which are sufficiently highly charged, and have sufficient number density, to achieve high efficiency particulate collection of even uncharged particulates, by means of a monopole—dipole interaction, instead of the monopole—monopole interaction between charged droplets and charged particulates, used in the conventional approach.

In the present invention, each highly charged liquid droplet induces an electric dipole moment in each nearby uncharged particulate. As is well known, there is an attractive force between an electric monopole and a nearby induced electric dipole. So in the present invention, the particulates are drawn to the charged droplets by the monopole—dipole force, rather than the monopole—monopole force which acts in apparatus using the conventional approach. Since the particulate is uncharged, collection of the particulate by the liquid droplet causes no change in the magnitude of the droplet charge, so that there is no reduction in the magnitude of the dipole moment inducing capacity of the droplet.

As detailed below, the magnitude of the monopole—dipole force has a markedly different and far more sensitive dependence on the droplet—particulate separation distance, and also a more sensitive dependence on the droplet charge magnitude, than the monopole—monopole force active in the conventional apparatus.

So, the present invention must meet the related needs of providing, in the gas to be cleaned, an adequate number density of adequately charged liquid droplets, in order to produce high efficiency of particulate cleaning through use of the monopole—dipole force.

And, there is a need for such an invention which also can achieve a sufficient efficiency of removal of pollutant gases from the gas to be cleaned, by providing, within the gas to be cleaned, a suitable number density of the liquid droplets and a sufficient surface area of the droplets, to provide sufficient liquid droplet surface area per unit volume, to allow the required adsorption of the pollutant gases by the liquid droplets. As detailed below, the present invention also meets this need, with the same droplets which are adequate for achieving high efficiency of particulate collection through the action of the monopole—dipole forces between droplets and particulates.

It is desirable that such an invention be able to maintain constancy of the liquid droplet charge magnitude, as the droplets interact with the gas to be cleaned, so as to maintain the particulate collection capacity of each droplet during such interaction, rather than having that capacity be depleted as would occur if the droplet charge were to be depleted.

And there is a related need for such an invention which can achieve the needed degree of charging of the liquid droplets without the use of very high voltages which are often required in electrostatic precipitator machines, e.g. voltages of the order of 60 kv, since such voltages are apt to cause corona discharges in the gas to be cleaned, which may well deplete the droplet charges, as well as producing other undesirable effects, including space charge effects which may interfere with adequate charging of the liquid droplets.

The present invention apparatus fulfills this need through the use of electrode geometry at the site of droplet production and charging, involving spreading liquid sheet electrodes emitting the droplets from the edges of the liquid sheets, interspersed with metal induction electrodes, with electrostatic potential of no more than about 20 kv existing between the induction electrode array and the array of liquid sheets, and with spacing such that adequately high electric field strength can be maintained at the edges of the liquid sheets to allow adequate charging of the droplets emitted from the liquid sheets, without the occurrence of corona discharges.

As further detailed below, other needs met by the present invention include, without limitation: allowing the particulate and pollutant gas scrubbing procedures to be carried out simultaneously in a single chamber; requiring no significant power other than that for the blower or other means which moves the gas to be cleaned through the cleaning chamber; and allowing these results to be achieved with low liquid-to-gas flow ratios.

SUMMARY OF THE INVENTION

The invention is a gas scrubbing apparatus and method, employing charged liquid droplets for removal of both particulates and pollutant gases from the gas to be cleaned, allowing scrubbing of uncharged particulates by means of monopole—dipole attractive forces between the charged liquid droplets and the electric dipoles induced in the uncharged particulates by the charged droplets; and allowing enhanced scrubbing of pre-charged particulates by use of charged droplets of opposite charge polarity; said apparatus in one embodiment having electrode geometry, at the site of droplet production and charging, comprising means for generating parallel spreading conductive liquid sheets constituting electrodes emitting the droplets from the edges of the liquid sheets, interspersed with electrically conductive induction electrodes, parallel to said liquid sheet electrodes, with electrostatic potential of no more than about 20 kv existing between the induction electrode array and the array of liquid sheet electrodes, and with spacing such that adequately high electric field strength can be maintained at the edges of the liquid sheets to allow adequate charging of the droplets emitted from the liquid sheets, without the occurrence of corona discharges which could deplete droplet charges or interfere with production of the electric field strength required for adequate droplet charging; said method comprising the steps of producing charged liquid droplets in suitable quantities, of suitable size, and suitable charge state; and intimately mixing said charged droplets with the gas to be cleaned; where suitability of liquid droplet quantities, size and charge state are determined by desired collection efficiencies for particulates and for toxic or acid gases contained in the gas to be cleaned, as detailed below; said invention allowing particulate and pollutant gas scrubbing procedures to be carried out simultaneously in a single chamber; requiring no power other than that for the blower or other means which moves the gas to be cleaned through the cleaning chamber; and allowing these results to be achieved with low liquid-to-gas flow ratios.

BRIEF DESCRIPTION OF THE DRAWINGS

In the drawings, which all illustrate one preferred embodiment of the invention:

FIG. 2 is a plan view of the nozzle assembly.

FIG. 3 is an expanded side elevational view showing two of the nozzles, with the emitted spreading liquid sheets breaking up into droplets, and the adjacent induction electrodes.

FIG. 4 is an expanded elevational view, from a direction perpendicular to the direction of view in FIG. 3, showing two of the nozzles emitting spreading liquid sheets breaking up into droplets.

DESCRIPTION OF THE PREFERRED EMBODIMENT

Figure 1:
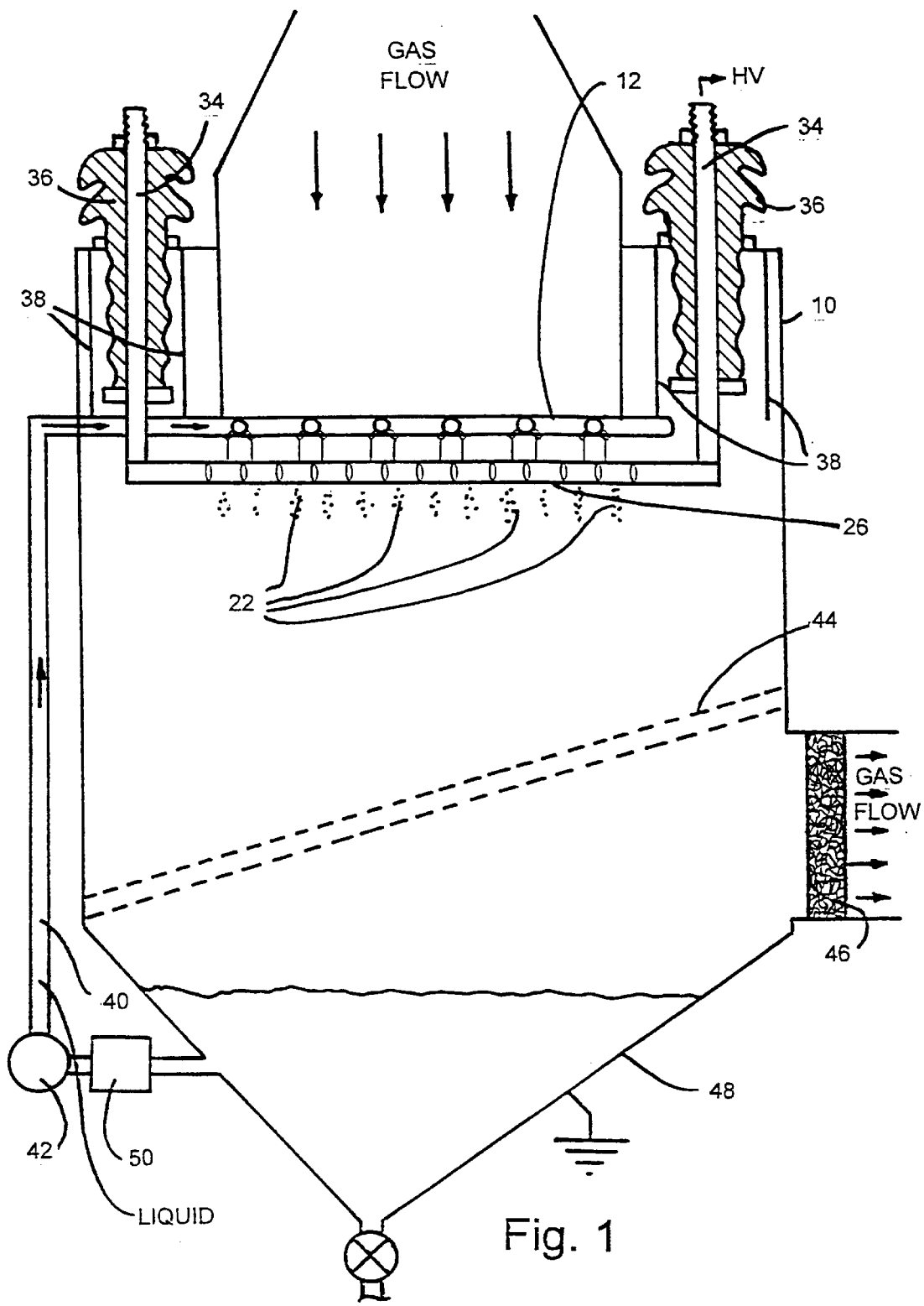
FIG. 1 is a front elevational view.

Referring now to the drawings, in which like reference numbers denote like or corresponding elements, the principal components of the preferred embodiment apparatus of the present invention, housed within a vertical chamber 10 in which the gas to be cleaned is caused to flow vertically downward by a fan or other external driving force, not shown, are a nozzle assembly 12, comprising at least one and normally a plurality of parallel horizontal tubes 14, each having a series 16 of nozzles 18, each of nozzles 18 emitting a downwardly moving vertically oriented spreading liquid sheet electrode 20 of conductive liquid, best illustrated in FIG. 4, each of said liquid sheet electrodes 20 emitting copious quantities of liquid droplets 22 in a primarily downward direction from its edge 24 at which the sheet of liquid has diverged sufficiently to break into the individual liquid droplets 22; and an array 26 of parallel vertical planar induction electrodes 28, with said induction electrodes 28 being located beneath and parallel to the tubes 14 and to the liquid sheet electrodes 20, and with said induction electrodes 28 being equally spaced between the planes of said liquid sheet electrodes 20, and with the vertical relative positioning of nozzle assembly 12 and array 26 being such that the edges 24 of liquid sheet electrodes 20 are located near or below the horizontal plane 30 intersecting each of the upper edges 32 of induction electrodes 28.

To provide high voltage to the induction electrodes 28, the array 26 of induction electrodes 28 is connected to a conventional high voltage source, not shown, by means of an electrical connector 34 extending to the outside of chamber 10 through an electrical bushing 36, with the portion of the surface of bushing 36 within chamber 10 being maintained at a temperature of about 5 degrees Celsius above the dew point temperature of the gas to be cleaned, with bushing 36 being surrounded by a shield 38, to protect bushing 36 from contamination by particulates in the gas to be cleaned. The required heating of bushing 36 may be done by means of electrical heaters (not shown) mounted inside of shield 38, or by use of a dry, warm purge gas injected within shield 38. Electrical heating could be provided by using a resistive glaze on the surface of bushing 36, through which glaze a current is caused to flow. The purpose of heating bushing 36 to about 5 degrees celsius above the dew point temperature is to prevent condensation of liquid on the surface of bushing 36, which condensation would tend to cause shorting of the high voltage carried on electrical connector 34.

The tubes 14, which are hollow, communicate via a liquid supply tube 40, with a pressurized source of conductive liquid, preferably recirculated liquid driven by a pump 42 as further detailed below, to provide a continuous supply of pressurized conductive liquid for maintenance of the liquid sheet electrodes 20 and for continuous generation of the droplets 22 emitted from the edges 24 of liquid sheet electrodes 20.

Figure 5B:
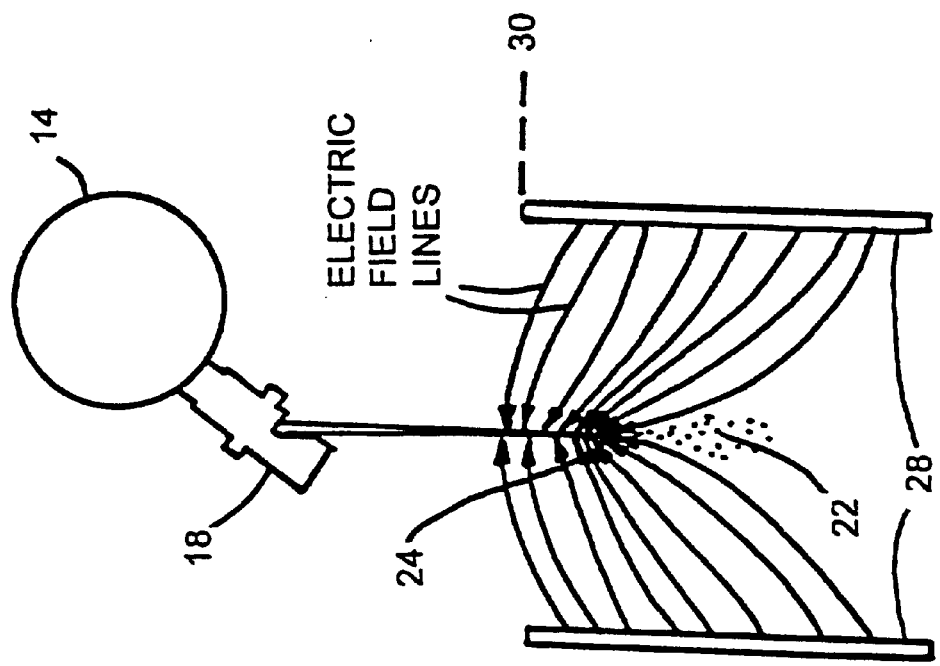
FIGS. 5(a) and 5(b) qualitatively illustrate two configurations of electric field lines extending between one of the liquid sheets, near the edge thereof, and the two adjacent induction electrodes, for two different relative configurations of the liquid sheet edge in relation to said induction electrodes. For simplicity only one set of nozzles and one pair of induction electrodes are shown in these figures.
Figure 5A:
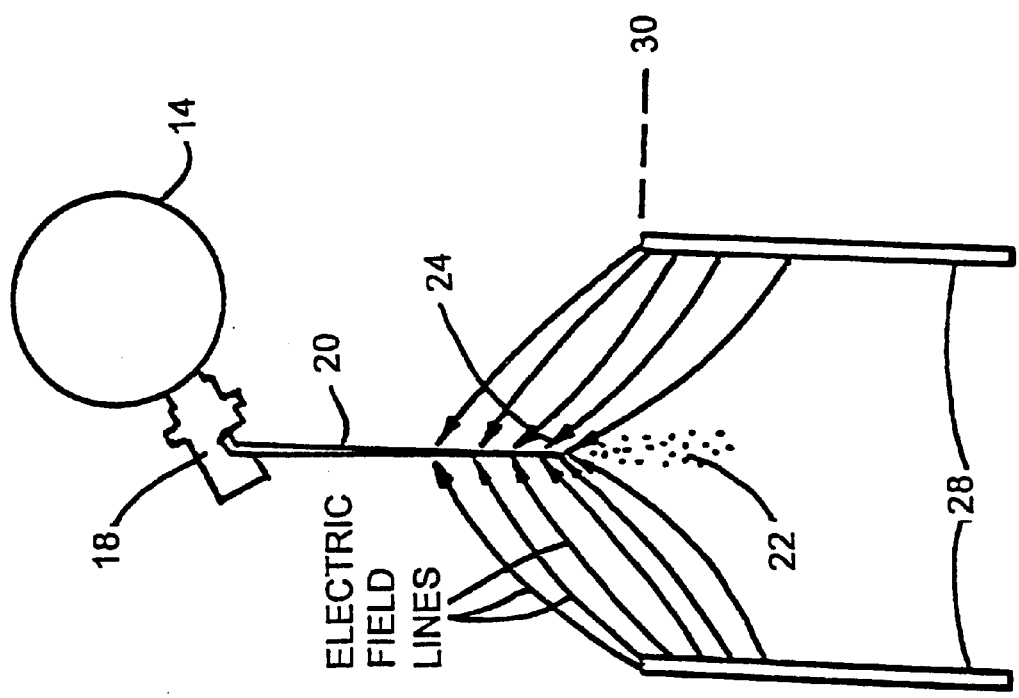

The means for charging of the droplets 22 leaving the edges 24 of liquid sheet electrodes 20 is afforded by the high electric field strength existing adjacent to the edges 24, resulting from the crowding of the electric field lines, extending between induction electrodes 28 and liquid sheet electrode 20, near edges 24, which is illustrated in FIGS. 5(a) and 5(b). The droplets 22 are exposed to this high field strength during emission from edges 24 of liquid sheet electrodes 20. Applicant's numerical calculations indicate that the maximum, optimum electric field strength near the edges 24 will be obtained if the edges 24 are located in the upper half of the region between the adjacent induction electrodes 28. The electric current required for continuous emission of the charged droplets 22, flows through the liquid sheet electrodes 20 from nozzle assembly 12, with nozzle assembly 12 and chamber 10 being grounded.

After the collection of particulates and pollutant gases by the charged liquid droplets 22, which processes are discussed in detail below, the droplets 22 are then removed from the flowing stream of gas to be cleaned, by a conventional impingement separator 44 and/or a conventional mist eliminator 46. Liquid collected by separator 44 and/or mist eliminator 46 is then collected in a sump 48, and then strained through a strainer 50, after which said liquid is returned to nozzle assembly 12 through liquid supply tube 40 by the action of a pump 42, which pump 42 has a controllable output pressure so as to allow control of the pressure of liquid flowing to the nozzle assembly 12.

Summary of Functional Means of Preferred Embodiment

In the preferred embodiment, the sump 48, pump 42, and liquid supply tube 40, together constitute a pressurized liquid means, being a source providing a pressurized liquid at a controllable liquid pressure.

A droplet production means, connected to said pressurized liquid means, for emitting copious quantities of liquid droplets 22, is provided by the nozzle assembly 12 of nozzles 18 and the liquid sheet electrodes 20 emitted from nozzles 18, which liquid sheet electrodes 20 emit copious quantities of the droplets 22 at the edges 24 of liquid sheet electrodes 20.

A droplet charging means, communicating with said droplet production means, is provided by the combination of the high voltage source, not shown, connected by connector 34 to array 26 of induction electrodes 28, the relative configurations of liquid sheet electrodes 20 and induction electrodes 28, and the resulting high electric field strength existing at the edges 24 of liquid sheet electrode 20 where droplets 22 are emitted.

An injection means, acting upon the droplets 22, for injection of droplets 22 into the gas to be cleaned, is provided by the combination of the pressurized liquid means, the droplet production means, and the presence of the droplet production means in the stream of flow of the gas to be cleaned, resulting in injection of the droplets 22 with significant velocity into the stream of flow of the gas to be cleaned.

A droplet removal means, communicating with said gas to be cleaned and said droplets 22 injected into said gas, for removing said droplets from said gas to be cleaned after said droplets have interacted with said gas, and for collecting together the liquid contained in said droplets, is provided by the combination of conventional impingement separator 44 and/or conventional mist eliminator 46, and sump 48 which collects said liquid from said droplets 22.

Before discussing the suitable values of operating parameters for the invention, it is useful to consider the relevant physics.

Some Relevant Background Physics

Although applicant cannot precisely calculate or measure all of the physical variables of the processes occurring during cleaning of air or other gas by operation of the invention, though having successfully tested a prototype, much of the relevant physics is known at least generally, for the monopole/dipole interaction involved in removing the particulates, and for the removal of toxic or acid gases by the liquid droplet scrubbing. It is useful to consider this physics, since it is relevant to choice of suitable operating parameters and conditions for the invention.

The invention makes use of the monopole/dipole attractive force, to attract even uncharged particulates in a gas to charged liquid droplets introduced into the gas, the electric monopole field of the charged droplet inducing a dipole in the uncharged particulate. Each of the charged droplets 22 has a monopole electric field, varying as the droplet charge over the square of the distance from the droplet, which will induce an electric dipole moment in a pollutant particulate in the droplet's vicinity, with the magnitude of the dipole moment being determined, for a given droplet charge and distance, by the particulate's geometry and dielectric constant. Although the net force on an electric dipole moment in a uniform electric field is zero (since the uniform field exerts equal and opposite forces on the equal and opposite charges constituting the dipole), it is readily seen that this is not so for the force on the particulate's electric dipole moment which has been induced by the electric monopole of the charged droplet 22 in the vicinity of the particulate. The electric monopole field of droplet 22 exerts an attractive force on the particulate's dipole moment, since the attractive force between the monopole charge, and the dipole's opposite polarity induced charge on the side of the particulate facing the droplet, is slightly greater in magnitude than the magnitude of the repulsive force between the monopole and the like polarity charge induced on the opposite side of the particulate, due to the thickness of the particulate and the fact that the monopole field strength varies inversely as the square of the distance from the monopole, droplet 22.

It may readily be shown that the magnitude of the attractive force between one of the charged liquid droplets 22, and an uncharged particulate having an electric dipole moment induced by the monopole charge on the charged droplet 22, is proportional to the square of the droplet charge, and inversely proportional to the fifth power of the distance between the center of liquid droplet 22 and the particulate, assuming that the distance is large compared to the particulate size. A. D. Moore, *Electrostatics and Its Applications* (J. Wiley & Sons, N.Y., 1973), §14.2.7 at 348, eq. (11). This dependence may indeed readily be seen from first principles, since: (1.) the particulate dipole moment will be, for a given particulate dielectric constant and geometry, some constant times the magnitude of the monopole electric field at the location of the particulate, which field is proportional to the monopole (liquid droplet) charge and inversely proportional to the square of the monopole/dipole distance; (2.) So the particulate dipole moment, and the corresponding magnitude of each of the opposite charges induced on the sides of the particulate facing toward and away from the droplet 22, thus varies as the droplet charge over the square of the separation distance; (3.) The magnitude of the net attractive force between the droplet and the particulate will be the difference between the attractive force exerted by the droplet charge on the opposite polarity charge induced on the side of the particulate facing toward the droplet, and the repulsive force exerted by the droplet charge on the like polarity charge induced on the side of the particulate facing away from the droplet, which is slightly less than the other, attractive force, due to the slightly greater distance from the droplet, i.e. the particulate thickness; and (4.) Simple algebra shows, upon taking the difference between those forces and assuming that the droplet/ particulate separation distance is much larger than the particulate thickness, that the net attractive force varies as the square of the droplet charge and varies inversely as the fifth power of the separation distance.

Since the monopole/dipole force is proportional to the square of the monopole (droplet) charge, and inversely proportional to the fifth power of the monopole—dipole distance (droplet—particulate distance), collection efficiency can be expected to depend strongly on both the magnitude of the charge carried by the average droplet, and on intimate mixing of the charged droplets with the gas to be cleaned. As further detailed below, the invention imparts charges to the droplets which are a significant fraction of the maximum charge which may be carried thereon, sometimes termed the Rayleigh limit, said maximum charge being a function of droplet size and surface tension of the liquid used to form the droplets 22. The Rayleigh charge limit is given by $$Q_R = [16 \pi (4 \pi \epsilon) (\sigma r^3)]^{1/2},$$

where $\sigma$ is the surface tension of the liquid and r is the radius of the droplet; and $(4 \pi \epsilon)$ is a constant having a value of $1/(9.0 \times 10^9)$ when all of the parameters are given in MKS units, i.e. $Q_R$ in Coulombs, $\sigma$ in Newtons per meter, and r in meters.

Applicant's computer simulation calculations indicate that, in order to provide a particulate collection efficiency per droplet of approximately 0.1, the needed charge Q which should be induced on the droplet is about 0.2 $Q_R$.

For a given droplet charge, the average available monopole/dipole force increases as the droplet size decreases.

Consider, for example, a droplet which, when created at edge 24 has a radius $R_0$ and carries a charge $Q_0$. As that droplet passes thorough the gas a significant number of particulates in its path will come within a very close distance of the droplet's surface. If that distance is small with respect to $R_0$, then the force $F_0$ acting to pull the particulate toward the droplet is proportional to $Q_0^2$, and the inverse of $R_0^5$.

Now, if that same droplet begins to evaporate, it will retain its original charge $Q_0$, but its radius will become less than $R_0$. Let us assume that the droplet evaporates until its radius is ½ $R_0$. Then those particulates which come within a small distance of the droplet will experience a force toward the droplet of $32F_0$.

As to the maximum value of the initial charge $Q_0$ which can be placed on a liquid droplet: For a given electric field strength at the edge 24, the charge which is left on the droplet is proportional to the surface area of the droplet at birth. Therefore, as long as the charge does not exceed the Rayleigh limit, the larger sized droplets will carry a larger charge $Q_0$ at birth.

The above considerations favor using droplets of larger initial size, for the sake of having high droplet charging to achieve maximum efficacy of particulate collection through the monopole/dipole interactions.

The use of droplets of larger initial size and hence high charge makes the present invention device especially effective when the gas to be cleaned has high temperature and low relative humidity. Typically, such gases are first passed through a "quench" chamber in which a spray of water is used to humidify and cool the gases before passing them through the air pollution control device. When hot gases are passed through the present invention device, the device not only quenches, but the particulate collection efficiency of the device is enhanced by the partial evaporation from the droplets in the process of quenching. Thus the device is even more effective when used as a single device to both quench, and also remove particulates and toxic gases.

On the other hand, the invention also seeks to have the droplets adsorb pollutant gases, i.e. toxic and acid gases. This process would appear to be facilitated by maximizing the droplet surface area per unit volume of gas to be cleaned. Since the volume per liquid droplet varies as the cube of the droplet radius, and the surface area per liquid droplet varies as the square of that radius, the effective collecting surface area per unit volume of injected liquid varies inversely as the droplet radius; a consideration favoring use of smaller droplets, for maximizing pollutant adsorption by the droplets.

These considerations together suggest that there may be an optimum range of droplet size, for achieving both acceptable levels of gas adsorption efficiency, and desired high levels of particulate collection efficiency.

To understand the processes involved in collection of the particulates by the droplets 22, one must consider the effect of the gas to be cleaned, located between the droplets 22 and the particulates, which greatly reduces the attainable particulate collection efficiency: Consider a droplet 22, of a given cross sectional area, injected into the gas to be cleaned, with an initial velocity relative to said gas, which droplet moves through a given travel length in the gas, relative to the gas, before being removed from the gas. Consider a given particulate, initially located ahead of the droplet, within the droplet travel length, and near the axis of motion of the droplet, within the volume which the droplet will sweep out in its motion through the gas, i.e. the volume swept out by the droplet cross sectional area, moving through the droplet travel length, which may be called the droplet sweep volume. It is easily seen that most particulates initially located within that volume will not be swept up by the droplet, due to the effects of the gas to be cleaned. As the droplet approaches a given such particulate, the moving droplet produces a bow wave in the gas, moving ahead of the droplet, which bow wave acts to displace the particulate to a greater separation from the axis of motion of the droplet, so as to cause the particulate, along with the gas in its immediate vicinity, to flow around the surface of the droplet, as the droplet passes the original location of the particulate. For this reason, as is well known in the art, the droplet, if uncharged, will only collect about one in one thousand to one in ten thousand of the particulates originally located in the droplet sweep volume. See, e.g., *Atmospheric Chemistry and Physics*, by J. H. Seinfeld and S. N. Pandis (J. Wiley & Sons, Inc., 1998), at p. 1020 (graph for "semiempirical correlation for the collection efficiency" for submicron particulates). As detailed below, however, a much higher efficiency for particulate collection per droplet is achieved with applicant's preferred embodiment of the present invention.

The efficiency of the droplet—particulate collection process via the monopole/dipole interactions can remain constant while the droplets are in the gas, if the droplets maintain constant charge (which is of course not affected by collection of uncharged particulates). So, it is advantageous to operate the invention at voltages low enough to avoid corona discharges which could cause loss of droplet charge, while yet providing high enough electric field strength at the site of droplet generation, to achieve adequate droplet charging.

Though the particulates need not be charged for collection through the monopole/dipole force process, if the particulates are charged before exposure to the invention, collection efficiency may be enhanced by use of charged droplets of polarity opposite to that of the particulates, to produce added attractive electrostatic force between the droplets and particulates. However, adsorption of the oppositely charged particulates would of course reduce the droplet charge, thus reducing the monopole/dipole component of the force between the droplet and other particulates, and so reducing later particulate collections resulting from the monopole/ dipole interactions. But, it will be seen below that this is a small effect for preferred operating parameters for the invention.

Of course for the droplets 22 to accomplish the particulate collection through the monopole—dipole force interaction, and the scrubbing of the toxic or acid gases, the droplets 22 must be brought into intimate contact with the gas to be cleaned. This will be accomplished as the droplets 22 rapidly transfer their initial momentum from the velocity of emission from nozzles 18, to the gas to be cleaned, due to viscous drag forces, slowing to a relative velocity less than about 1 meter/sec.

Suitable Operating Parameters

Applicant's tests with a prototype of the preferred embodiment have resulted in particulate collection efficiencies of 90% or greater, with the following operating parameters, where the gas to be cleaned was air at atmospheric pressure and room temperature and had added, in one case, 20 ppm of about 0.05 micron diameter ammonium chloride particulates, for which case a greater than 90% particulate removal efficiency was obtained, and in another case, a submicron sized sulfur particulate aerosol, for which case the particulate removal efficiency exceeded 99%:

1. The high voltage applied to induction electrodes 28 was typically about −17 kv, in a range from −10 kv to −20 kv;

2. The spacing between each of induction electrodes 28 and the closest of liquid sheet electrodes 20 was 1" (2" between adjacent ones of liquid sheet electrodes 20, the liquid sheet electrodes 20 being evenly spaced between the induction electrodes 28); however the maximum electric field strength adjacent to the edges 24 of liquid sheet electrodes 20 is believed to have exceeded, by at least a factor of ten based on applicant's numerical calculations, the 17 kv/inch average field strength indicated by the above voltage and spacing figures, due to the field line concentration at the edges 24, illustrated in FIGS. 5(*a*) and 5(*b*);

3. The liquid flow rate, of conductive liquid (tap water) used to form the droplets 22 was about 17 gallons/min. per 1,000 cfm (cubic feet per minute) flow rate of the gas to be cleaned, which gas was air in said tests, with the additives indicated above;

4. The diameter range of the droplets 22, was in the range from 25 to 250 microns, subsequent to any evaporation, based on the manufacturer's data for the nozzles used, and applicant's tests indicated that 140 microns was an optimum size, which was also a small enough size to give adequate adsorption of toxic or acid gases, with applicant's measurements indicating adsorption efficiency of 90% or greater;

5. The liquid flow pressure was about 45 psi, and the nozzles 18 were Bete Brand, Model NF02580 nozzles.

6. The droplets 22 moved an average distance of about 1 meter though the gas to be cleaned, relative to the gas.

7. With the above—described parameters it was possible to obtain quite satisfactory operation without occurrence of any corona discharge;

8. With the above—described operating parameters, applicant's calculations indicate that the droplets 22 have an average charge of about ten million elementary charge units, the elementary charge unit being the magnitude of the charge of one electron, i.e. $1.6\times10^{-19}$ Coulomb, which is quite adequate to produce a sufficient monopole—dipole force interaction effect, to achieve high particulate collection efficiency for uncharged particulates; according to applicant's numerical calculations, each of the charged droplets 22 collects about ten percent of the particulates originally in its path, i.e. ten percent of the particulates in a volume equal to the cross sectional area of the droplet times its distance of travel through the gas, the "droplet sweep volume" referred to above—a collection efficiency per droplet which is far higher than that for uncharged droplets, as already discussed above.

The ability to operate the invention without corona discharge under the conditions described above, which is desirable for reasons previously explained above, is believed to be due, in part at least, to the fact that before any liquid surface instability can fully develop at a point on one of the edges 24 of liquid sheet electrodes 20, to allow said surface electrode to become a focus electrode for inception of a corona discharge, that portion of the liquid breaks off into the droplets 22 being continuously emitted from the edges 24 of liquid sheet electrodes 20.

Applicant has derived a simple scaling relationship, to allow calculation of overall particulate removal efficiency, for conditions other than those specified above. If Ω denotes the overall particulate removal efficiency, if the droplets acted independently of one another in particulate collection, i.e. the collection efficiency for very low efficiencies, $$\Omega=(\text{Volume effectively swept per droplet})\times(\text{Number of droplets})/(\text{Volume of gas in chamber}).$$

So for steady state conditions, $$\Omega=(\text{Volume effectively swept per droplet})\times(\text{Droplet production rate})/(\text{Volume flow rate of gas through chamber}).$$

Let E denote the collection efficiency per droplet, defined as the fraction of the droplet cross sectional area for which all particulates in the droplet path are collected, which is much smaller than unity, for the reasons already discussed above in the background physics section, E being about one in ten thousand for uncharged droplets, and being about 0.1 for applicant's charged droplets using the monopole—dipole force particulate collection process, as noted above. And let $V_g$ denote the volume flow rate of gas flowing through chamber 10, and $V_1$ the liquid volume flow rate. Letting r denote the average radius of the droplets 22, then obviously $$V_1=(4/3)\,\pi r^3\times(\text{Droplet production rate}),\ \text{or}\ (\text{Droplet production rate})=V_1/((4/3)\,\pi r^3)$$

If L denotes the average length of travel of the droplets 22 through the gas, for the droplet motion relative to the gas, then, by the definition of E, the $$\text{Volume effectively swept per droplet}=L\times\pi r^2\times E.$$

It follows that $$\Omega=(3/4)\times(V_1/V_g)\times(L/r)\times E.$$

Or, expressing the overall particulate collection efficiency formula, for low efficiencies, in terms of the droplet diameter d=2 r, $$\Omega=1.5\times(V_1/V_g)\times(L/d)\times E.$$

However, Ω would only be the collection efficiency if the droplets acted independently of one another, which would only be approximately true for very small collection efficiencies. If the collection efficiency is not small, the number of particulates collected by a given droplet will be reduced due to the particulate collection by earlier droplets. It can be shown that the overall particulate collection efficiency r of the device is actually given by $$\Gamma = 1 - e^{-\Omega}$$

for the case of nonsmall collection efficiency. Some corresponding values of the dimensionless efficiency Γ and the dimensionless parameter Ω are:

| Ω | Γ (%) |
|---|---|
| 1 | 63 |
| 2 | 86 |
| 3 | 95 |
| 4 | 98 |
| 5 | 99 |
| 7 | 99.9 |
| 10 | 99.995 |

So, using the above relationships, one can easily calculate, for a given value of the per droplet collection efficiency E, suitable combinations of $V_1$, $V_g$, L and d, to produce a desired overall particulate collection efficiency Γ.

As to collection efficiency scaling for collection of toxic or acid gases, applicant has not yet completed computer simulations for the toxic or acid gas collection efficiency per droplet, $E_g$. However, a rough estimate of $E_g$ is given by $$E_g = s_D / s_R,$$

where $s_D$ is the diffusion speed of the toxic or acid gas, and $s_R$ is the speed of the droplet relative to the gas. The value of $s_R$ can be represented by D/δ, where D is the diffusion coefficient of the gas and δ is the boundary layer thickness of the gas at the droplet surface. See, Aerosol Technology, by W. C. Hinds, John Wiley & Sons, 1982, at p. 147.

Under typical values of these parameters for toxic or acid gases and 140 micron diameter droplets, the value of $E_g$ is greater than 1. So for a highly charged 140 micron droplet, the single droplet collection efficiency for toxic or acid gases, $E_g$, is about ten times greater than the collection efficiency for particulates.

The per droplet toxic or acid gas collection efficiency $E_g$ is equivalent to the per droplet efficiency E for particulates. So the overall toxic or acid gases collection efficiency for the device can be found by applying $E_g$ instead of E in the formula given above for Ω, and applying Ω so determined in the formula given above for Γ.

With reference to the claims below, the scaling information given above will allow persons of ordinary skill in the art to make and operate the invention so as to achieve desired useful collection efficiencies for particulates, and also for toxic or acid gaseous pollutants, collection efficiencies exceeding 60 per cent and usually substantially greater than that, in many cases exceeding 99 per cent, including achieving such efficiencies throughout the indicated ranges of operational parameters stated in the claims, by choices of suitable combinations of all operational parameters.

Possible Variations From the Preferred Embodiment

Those familiar with the art will appreciate that the invention may be employed in configurations other than the specific form disclosed above, without departing from the essential substance thereof.

For example, and not by way of limitation, though the particulates need not be charged for collection in the preferred embodiment, due to the use of the monopole—dipole force effect, it would of course be possible to employ the invention with a gas to be cleaned which contains charged particulates, in which case the voltage applied to induction electrodes 28 should be of the same polarity, to provide droplets 22 of opposite polarity to that of the particulates. In this system the monopole-monopole attractive force between oppositely charged particulates and droplet 22 would complement the monopole—dipole attractive force. Although the collection of an oppositely charged particulate would reduce the charge of a droplet 22, and thus reduce the subsequent strength of the monopole—dipole force interaction of droplet 22 with other particulates, this would be a very small effect for typical particulate charges of only up to about 10 elementary charges imparted in conventional particulate charging apparatus, since, in the present invention operation conditions described above, the droplet charge is of the order of ten million elementary charges.

Although the preferred embodiment is of a form suitable for operation with downward flow of the gas to be cleaned, it would of course be possible to configure the invention, operating under the same processes, with the gas to be cleaned instead flowing horizontally, with chamber 10 being oriented horizontally.

Though the preferred embodiment injects the droplets 22 in a direction parallel to the flow of the stream of gas to be cleaned, it would be possible to use the invention in another configuration, for example with the direction of gas flow being opposite to the direction of injection of the droplets 22. For example, the gas to be cleaned might be caused to flow upward instead of downward, in use of the apparatus shown in the figures. Applicant believes, however, that a configuration in which the direction of injection of the droplets 22 is opposite to the direction of the gas flow would be inferior to the preferred embodiment if the speed of the gas flow is sufficient to cause a reversal of the direction of travel of the droplets 22. Such a configuration would cause the droplets 22 to be carried back through array 26 of induction electrodes 28 and nozzle assembly 12. Such a configuration would result in a loss of droplets 22 via impingement on array 26 and nozzle assembly 12, and the electrical charges on droplets 22 would reduce the electric field strength at the edges 24 of liquid sheet electrodes 20, thereby reducing the charges on droplets 22 subsequently emitted from the edges 24 of liquid sheet electrodes 20.

It would be possible to configure the invention such that the droplets 22 are injected at other angles, for example, perpendicular, to the flow of the stream of gas to be cleaned.

The invention need not employ the particular means of the preferred embodiment, for removal of the droplets 22, from the stream of gas to be cleaned, after they have collected the particulates and/or toxic or acid gases. One could instead use other droplet removal means well known in the art, e.g. removal by electrostatic precipitation of the charged droplets 22, or by a centrifugal removal apparatus.

Although the preferred embodiment collects and recirculates the liquid from the droplets 22 after cleaning the liquid by passage through strainer 50, it would of course not be necessary to recirculate the liquid, if conservation of the water or other liquid used in producing the droplets 22 was not a concern; the liquid supply tube 40 conveying liquid for the nozzles 18 could instead be simply connected to a source of fresh liquid, and the liquid collected from the droplets 22 removed from the gas to be cleaned could be discarded as waste, after any required waste treatment.

The application of the invention need not be limited to use of the particular means of the preferred embodiment, for production of copious quantities of the droplets 22; instead other means could be used to produce the spreading liquid sheet electrodes 20, e.g. apparatus producing two colliding streams of liquid, or other, single-orifice nozzles, commonly known as “V-jet”, or “fan” nozzles, which produce spreading liquid sheets.

Although DC voltage has been employed by applicant in tests of the preferred embodiment prototype, the invention could be employed with use of voltages of other wave forms.

While the preferred embodiment employs a single nozzle assembly 12 and a single array 26 of induction electrodes 28, it would of course be possible to employ a version of the invention having multiple pairs of these assembly/arrays, e.g. at different locations in the stream of the gas to be cleaned, e.g. at different heights in FIG. 1, for even greater pollutant collection efficiency.

Although tap water has been used in applicant's tests of the preferred embodiment prototype, the use of the invention is not limited to use of any particular liquid for production of the charged droplets 22, provided said liquid has sufficient conductivity to allow adequate charging of the droplets 22. The liquid should have a conductivity of at least about 50 micro Siemens/cm. The scope of the invention is defined by the following claims, including also all subject matter encompassed by the doctrine of equivalents as applicable to the claims.

I claim:

1. Apparatus for removing both particulate pollutants and gaseous pollutants, from a gas to be cleaned, said gas to be cleaned already flowing in an established gas flow stream and gas flow direction upon entry into said apparatus, said gas flow direction defining a downstream direction in said gas flow stream as a direction parallel to said gas flow direction and defining an upstream direction in said gas flow stream as a direction opposite to said gas flow direction, said apparatus comprising:

(a) a pressurized liquid means, being a source providing a pressurized liquid at a controllable liquid pressure;

(b) a droplet production means, connected to said pressurized liquid means, for emitting copious quantities of droplets of said liquid;

(c) a droplet charging means, communicating with said droplet production means, for exposing said droplets, at the instant of emission of each of said droplets from said droplet production means, to an electric field of strength sufficient for charging said droplets to an average charge which is at least an appreciable portion of the maximum charge which may be carried by said droplets of said liquid;

(d) an injection means, acting upon said droplets, for injection of said droplets into said gas to be cleaned, and for intimately mixing said droplets with said gas to be cleaned by causing said droplets to travel through said gas to be cleaned in motion of said droplets through a length of travel relative to said gas to be cleaned; and (e) a droplet removal means, communicating with said gas to be cleaned and said droplets injected into said gas, for removing said droplets from said gas to be cleaned after said droplets have interacted with said gas, and for collecting together said liquid contained in said droplets wherein said pressurized liquid means, said droplet production means, said droplet charging means, and said injection means are so configured and operated as to provide said droplets with a combination of size, charge, droplet production rate, and length of travel of said droplets in said gas to be cleaned such as to cause removal of said pollutants with a desired particulate removal efficiency for said particulate pollutants, and to also cause removal of said gaseous pollutants with a desired gaseous pollutant removal efficiency.

2. Apparatus of claim 1, for use with a gas to be cleaned containing electrically charged particulates having a particulate charge polarity prior to entry into said apparatus, wherein said droplet charging means produces droplets having a charge polarity opposite to said particulate charge polarity.

3. Apparatus of claim 1, wherein said gas flow direction is vertical.

4. Apparatus of claim 3, wherein said gas flow direction is vertically downward.

5. Apparatus of claim 1, wherein said gas flow direction is horizontal.

6. Apparatus of claim 1, wherein said droplet production means and said injection means cause said droplets to be injected into said gas to be cleaned in said downstream direction.

7. Apparatus of claim 1, wherein said droplet production means and said injection means cause said droplets to be injected into said gas to be cleaned in said upstream direction.

8. Apparatus of claim 1, wherein said droplet removal means comprises an impingement separator.

9. Apparatus of claim 1, wherein said droplet removal means further comprises a mist eliminator.

10. Apparatus of claim 1, wherein said droplet removal means comprises an electrostatic precipitator.

11. Apparatus of claim 1, further comprising a recirculation means, connected to said droplet removal means and to said pressurized liquid means, for recirculating back to said pressurized liquid means, said liquid collected from said droplets by said droplet removal means.

12. Apparatus of claim 11, wherein said recirculation means comprises a flow line containing a pump and a strainer means for straining said liquid.

13. Apparatus of claim 1, wherein said droplets have a diameter in the range from 25 microns to 250 microns.

14. Apparatus of claim 13, wherein said droplets have a diameter substantially equal to 140 microns.

15. Apparatus of claim 13, wherein said droplets are injected into said gas to be cleaned with an average electric charge having a magnitude in the range from 0.1 to 2.0 times ten million elementary charge units.

16. Apparatus of claim 1, wherein said droplet production means comprises a means for producing a plurality of parallel spreading liquid sheet electrodes of a conductive liquid, each having a principal flow direction parallel to said gas flow direction, said sheets having edges emitting said droplets, and wherein said droplet charging means communicates electrostatically with said droplet production means.

17. Apparatus of claim 16, wherein said droplet charging means comprises, in combination with said spreading liquid sheet electrodes, a plurality of parallel induction electrodes, parallel to said gas flow direction, and a high voltage means, connected to said induction electrodes, for creating a high voltage between said induction electrodes and said spreading liquid sheet electrodes.

18. Apparatus of claim 17, wherein said spreading liquid sheet electrodes and said induction electrodes each lie on at least substantially equally spaced parallel planes, with the plane of each of said spreading liquid sheet electrodes being at least substantially equally spaced between the planes of the adjacent induction electrodes, and wherein said induction electrodes are located, at least in principal part, downstream from said edges of said spreading liquid sheet electrodes, but in which said edge of each of said spreading liquid sheet electrodes is located at least substantially between said adjacent induction electrodes.

19. Apparatus of claim 18, in which said voltage between said induction electrodes and said spreading liquid sheet electrodes is in the range from 10 KV to 20 KV, and in which the spacing between planes of adjacent induction electrodes and spreading liquid sheet electrodes is substantially equal to one inch; and in which the flow rate of said liquid into said droplet production means is in the range from 10 to 30 gallons per minute per 1000 CFM of flow rate of said gas to be cleaned; and in which said pressurized liquid means provides said liquid at a pressure in the range from 30 p.s.i. to 100 p.s.i.; and in which said droplets have an average diameter in the range from 25 to 150 microns, and have an average electric charge having a magnitude in the range from 0.1 to 2.0 times ten million elementary charge units; and in which said length of travel of said droplets relative to said gas is at least 0.5 meters.

20. Apparatus of claim 18, in which said voltage between said induction electrodes and said spreading liquid sheet electrodes is substantially equal to 17 KV, and in which the spacing between planes of adjacent induction electrodes and spreading liquid sheet electrodes is substantially equal to one inch.

21. Apparatus of claim 18, in which the flow rate of said liquid into said droplet production means is substantially 17 gallons per minute per 1000 CFM of flow rate of said gas to be cleaned.

22. Apparatus of claim 18, in which said droplets have an average diameter substantially equal to 140 microns.

23. Apparatus of claim 18, in which said droplets have an average electric charge having a magnitude substantially equal to ten million elementary charge units.

24. Apparatus of claim 18, in which said length of travel of said droplets relative to said gas is at least 0.5 meters.

25. Apparatus of claim 18, in which said voltage between said induction electrodes and said spreading liquid sheet electrodes is substantially equal to 17 KV, and in which the spacing between planes of adjacent induction electrodes and spreading liquid sheet electrodes is substantially equal to one inch; and in which the flow rate of said liquid into said droplet production means is substantially 17 gallons per minute per 1000 CFM of flow rate of said gas to be cleaned; and in which said droplets have an average diameter substantially equal to 140 microns; and in which said droplets have an average electric charge having a magnitude substantially equal to ten million elementary charge units; and in which said length of travel of said droplets relative to said gas is substantially equal to one meter.

26. Apparatus of claim 1, wherein said particulate removal efficiency is at least 90 per cent.

27. Apparatus of claim 1, wherein said particulate removal efficiency is at least 99 per cent.

28. Apparatus of claim 1, wherein said gaseous pollutant removal efficiency is at least 90 per cent.

29. Apparatus of claim 1, wherein said gaseous pollutant removal efficiency is at least 99 per cent.

30. Method for removing both particulate pollutants and gaseous pollutants, from a gas to be cleaned, said gas to be cleaned already flowing in an established gas flow stream and gas flow direction prior to application of said method, said gas flow direction defining a downstream direction in said gas flow stream as a direction parallel to said gas flow direction and defining an upstream direction in said gas flow stream as a direction opposite to said gas flow direction, said method comprising the steps of:

(a) Producing copious quantities of liquid droplets;

(b) Exposing said produced droplets, at the instant of emission of each of said produced droplets, to an electric field of strength sufficient for charging said droplets to an average electric charge which is at least an appreciable portion of the maximum charge which may be carried by said droplets of said liquid;

(c) Injecting said charged droplets into said gas flow stream of said gas to be cleaned in a manner causing said droplets to be intimately mixed with said gas to be cleaned by causing said droplets to travel through said gas to be cleaned in motion of said droplets through a length of travel relative to said gas to be cleaned; and (d) removing said droplets from said gas to be cleaned after said droplets have interacted with said gas to be cleaned;

said method providing said droplets with a combination of size, charge, droplet production rate, and length of travel of said droplets in said gas to be cleaned such as to cause removal of said pollutants with a desired particulate removal efficiency for said particulate pollutants, and to also cause removal of said gaseous pollutants with a desired gaseous pollutant removal efficiency.

31. Method of claim 30, wherein said droplets have an average diameter in the range from 25 to 250 microns, and have an average electric charge having a magnitude in the range from 0.1 to 2.0 times ten million elementary charge units.

* * * * *